United States Patent [19]
Litz et al.

[11] Patent Number: 4,919,849
[45] Date of Patent: Apr. 24, 1990

[54] GAS-LIQUID MIXING PROCESS AND APPARATUS

[75] Inventors: Lawrence M. Litz, Pleasantville; John J. Santalone, Jr., White Plains, both of N.Y.

[73] Assignee: Union Carbide Industrial Gases Technology Corporation, Danbury, Conn.

[21] Appl. No.: 289,265

[22] Filed: Dec. 23, 1988

[51] Int. Cl.⁵ .................................................. B01F 3/04
[52] U.S. Cl. ..................................... 261/36.1; 261/87; 261/93; 261/123; 366/102; 366/295; 422/227
[58] Field of Search .................... 261/36.1, 87, 91, 93, 261/123; 422/224–229; 209/169, 170; 210/219, 220, 221.2; 75/97 R; 366/102, 104, 295; 416/189; 266/217; 435/312–316

[56] References Cited

U.S. PATENT DOCUMENTS

| | | | |
|---|---|---|---|
| Re. 32,562 | 12/1987 | Litz | 261/91 |
| 2,293,183 | 8/1942 | Walker | 261/93 |
| 2,404,679 | 7/1946 | Andron et al. | 261/93 X |
| 3,776,531 | 12/1973 | Ebner et al. | 261/87 |
| 3,846,516 | 11/1974 | Carlson | 261/91 X |
| 4,193,950 | 3/1980 | Stockner et al. | 261/87 |
| 4,277,328 | 7/1981 | Pfalzer et al. | 261/87 X |
| 4,290,885 | 9/1981 | Kwak | 261/87 X |
| 4,454,077 | 6/1984 | Litz | 261/91 |

FOREIGN PATENT DOCUMENTS

| | | | |
|---|---|---|---|
| 1139463 | 1/1983 | Canada | 261/93 |
| 27911 | 5/1981 | European Pat. Off. | 261/91 |
| 2218134 | 9/1974 | France | 261/87 |

*Primary Examiner*—Richard L. Chiesa
*Attorney, Agent, or Firm*—Alvin H. Fritschler

[57] ABSTRACT

A gas-liquid mixing process and apparatus having a vessel with an axial flow down-pumping impeller in a draft tube has gas ingestion tubes extending into a body of liquid from a hollow portion of the impeller shaft or other fluid communication means with the overhead gas in the vessel. Upon gas-liquid mixing at liquid levels that interfere with vortex development by the impeller, gas is drawn from the overhead through the ingestion tubes into the body of liquid.

20 Claims, 2 Drawing Sheets

GAS-LIQUID MIXING PROCESS AND APPARATUS

BACKGROUND OF THE INVENTION

1. Field of the Invention

This invention relates to gas-liquid mixing operations. More particularly, it relates to an improved mixer for enhanced gas liquid mixing under particular operating conditions.

2. Description of the Prior Art

In the Litz patent, U.S. Pat. No. 4,454,077 and the related reissue patent, Re. 32,562, an advantageous gas liquid mixing process and apparatus are disclosed, such technology being referred to in the art as the Advanced Gas Reactor (AGR) system. As commonly and advantageously employed for a variety of practical commercial applications, the AGR system incorporates an open-ended hollow draft tube in a gas liquid mixing vessel adapted to contain a body of said liquid. A down pumping impeller positioned within the hollow draft tube is employed to pump liquid in said body of liquid into the top of said hollow draft tube for discharge at the bottom thereof and overall movement in a recirculating flow path in the mixing vessel. Because of such recirculation of the liquid downward in the hollow draft tube and upward in the vessel outside said tube, and aided by the positioning of baffles at the top of said draft tube, vortices are formed in the inlet area of the draft tube such as to draw feed gas from the overhead space above the liquid level in the vessel into the recirculating liquid passing downward into the draft tube. It is this gas ingestion mechanism that provides a major benefit of the AGR system.

Satisfactory vortex development for such gas liquid mixing purposes depends, among various practical operating factors, on the maintaining of a proper liquid level above the top of the draft tube. At any particular liquid flow rate down the draft tube, the maximum gas ingestion will occur at a particular operating liquid level in the vessel above the draft tube. The liquid flow rate, in turn, is a function of the impeller-draft tube design and the rotational speed of the impeller. Thus, for a 9" double helical impeller, with a single 9" pitch length, running at 400 RPM, in water, within a baffled 10" inside diameter draft tube, the optimum liquid level is about 4" above the top of the draft tube. If the liquid level were about 8" above the top of the draft tube, however, the vortices would typically no longer form, and the gas ingestion rate would drop essentially to zero. Thus, operating at liquid levels above the optimum level can substantially reduce the gas ingestion capabilities of the AGR system.

In gas-liquid mixing operations subject to such non optimum liquid levels, therefore, the effectiveness of the AGR system in achieving enhanced gas-liquid mixing may be seriously impaired. A typical gas liquid mixing application in which an increasing liquid level may cause such non optimum operation of an AGR system involves the hydrogenation of nitro compounds. When nitrobenzene is hydrogenated to form aniline, for example, water is formed as a by product. If the AGR reactor (mixing) vessel were initially filled to the optimum level of liquid nitrobenzene to obtain good gas ingestion, via the vortex mechanism referred to above, the level of liquid would rise as the reaction proceeded. Thus, the by-product water produced would increase the liquid volume and cause the liquid level to rise in the vessel. A point would be reached when the liquid level became so high that the vortices would no longer form. At this stage of the operation, the reaction would stop because of the lack of hydrogen gas bubbles in the liquid phase. It will also be appreciated that, prior to reaching such stage, the rise in liquid level can be such that vortex formation and gas ingestion are less favorable than occurs when the liquid level is at the optimum level for the particular system.

Because of the highly desirable gas liquid mixing action achievable by the use of the AGR system, there is a desire in the art for further developments enabling the AGR system to be operated, and its benefits achieved, over a broader range of liquid levels. Such developments, enabling the AGR system to accommodate applications subject to a non optimum liquid level, as for example, a rising level of liquid within the mixing vessel, would enable the use of the AGR system to be desirably extended to a wider variety of practical gas-liquid mixing operations for which enhanced mixing, and enhanced gas utilization, are desired in commercial operations.

It is an object of the invention, therefore, to provide an improved AGR system and process for gas liquid mixing.

It is another object of the invention to provide an AGR system and process capable of effective operation over a range of liquid levels in the course of a given gas-liquid mixing operation.

With these and other objects in mind, the invention is hereinafter described in detail, the novel features thereof being particularly pointed out in the appended claims.

SUMMARY OF THE INVENTION

The invention comprises an AGR system in which a hollow impeller shaft and/or external tubes are employed, with the interior thereof establishing fluid communication between the gas in the overhead space above the gas liquid interface in the mixing vessel and a tube or tubes extending radially outward from said hollow impeller shaft or external tubes into the body of surrounding liquid below the gas-liquid interface in said vessel. The range of liquid levels over which the AGR system can be successfully operated is thereby increased.

BRIEF DESCRIPTION OF THE DRAWING

The invention is further described with reference to the accompanying drawings in which.

DETAILED DESCRIPTION OF THE INVENTION

The objects of the invention are accomplished by providing a secondary gas ingestion means for conveniently drawing gas from the overhead gas space in the mixing vessel into the liquid flowing downward in the hollow draft tube of the AGR system below the gas-liquid interface in the vessel. For example, the shaft for the impeller means of the AGR system may be hollow so as to establish fluid communication between the overhead gas space in the mixing vessel and radially extending tubes extending outward into the body of liquid passing downward in the draft tube during operation of the AGR system. A suction is created upon rotation of said impeller shaft, thereby drawing gas from the overhead gas space down trough the hollow impeller shaft and outward through said radially extending tubes into the body of liquid flowing downwardly in the draft tube as a result of the rotation of said hollow impeller shaft and of the down-pumping impeller driven thereby. By incorporation of this feature, the AGR system of the invention is able to operate successfully over a broader range of liquid levels than can be accommodated in a conventional AGR system not employing the inventive feature.

It will be understood that other means than said hollow impeller shaft may be employed to establish the desired fluid communication between the overhead gas space and the tubes radially extending from positions about the impeller shaft into the body of liquid. Thus, a vertical tube or tubes proximate to the impeller shaft and extending from the gas ingestion tubes up into the overhead gas space may be employed to establish said fluid communication between said gas ingestion tubes and said gas space.

Figure 1:
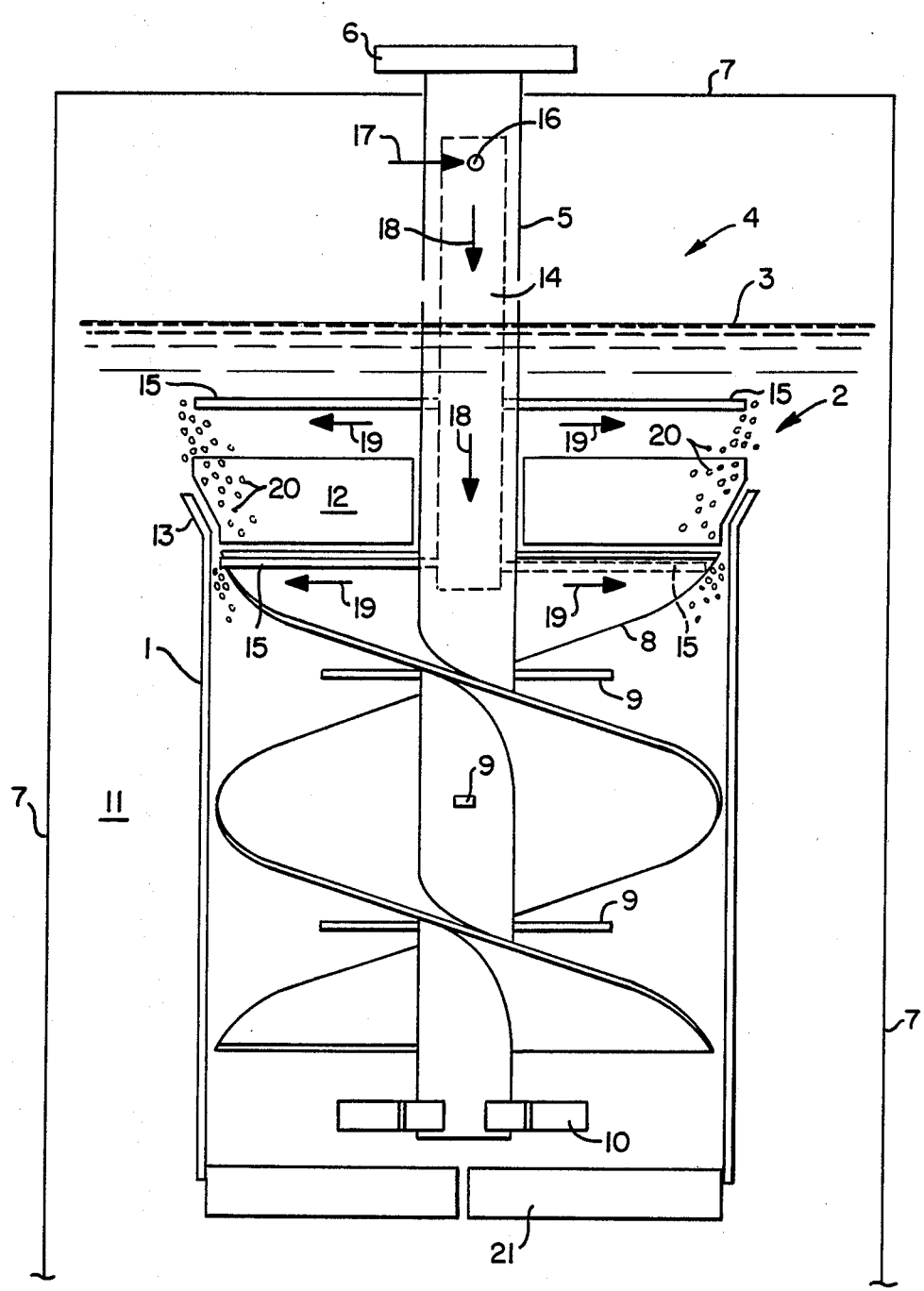
FIG. 1 is a side elevation view illustrating an embodiment in which a hollow impeller shaft is used to establish fluid communication between the overhead gas space and tubes radially extending from said shaft in and above the draft tube in the mixing vessel.

With reference to FIG. 1 of the drawing, the hollow draft tube of the AGR system is represented by the numeral 1 and will be understood to be positioned within an enclosed reactor or mixing vessel, partially shown as numeral 7. The AGR system will be understood to comprise, when used for the gas liquid mixing operations of the invention, a body of liquid 2, a variable gas liquid interface 3, and an overhead gas space 4 within the mixing vessel. As will be seen in the drawing, draft tube 1 is positioned within the body of liquid 2, below qas- liquid interface 3. As in a conventional AGR system, impeller shaft 5, having suitable drive means 6, has downward pumping helical impeller means 8 affixed thereto. In the illustrated embodiment, as in a typical conventional AGR system, turbulence promoter blades 9 are also supplied to said impeller shaft 5. When so employed, each such blade 9 is desirably affixed to shaft 5 at the point of maximum distance from the point of attachment of that portion of helical impeller 8 which is in the same horizontal plane as said blade 9. In the illustrated embodiment, it is useful to employ six such promoter blades 9, with two such blades radially opposed from one another at quarter, half and three quarters of the helix length down shaft 5 from a point on said shaft corresponding to the top of helical impeller 8. Such promoter blades can conveniently be employed in the form of bars, positioned desirably at a 90° angle to the points on shaft 5 where helical impeller 8 intersects said shaft 5. The illustrated embodiment also includes radial flow impeller 10 fixedly connected to shaft 5 for purposes of creating a high shear zone in the region of draft tube 1 between the portion of helical impeller 8 and the lower end of said draft tube 1

Draft tube 1 will be understood to extend from above the upper end of helical impeller 8 to a point below the lower end thereof that is substantially above the floor of the enclosed mixing vessel. Thus, adequate room is provided for liquid circulation down the inside of draft tube 1 and in an upward direction in the annular space 11 between said draft tube 1 and the walls of the mixing vessel. In order to facilitate such desired recirculation pattern, vertically positioned inlet guide baffles 12 are commonly provided in the region of the upper inlet end of draft tube 1 to assist in the directing of the upwardly flowing liquid in annular space 11 into the vortices created by the rotation of helical impeller 8 for downward passage within draft tube 1. It will also be noted, in the illustrated embodiment, that the top portion of draft tube 1 is an outwardly flared conical inlet section 13, employed to further facilitate the passage of upwardly flowing liquid in annular space 11 into said draft tube 1 for downward flow therein. Such conical section 13, preferably employed but not essential to the gas-liquid mixing operation carried out in the mixing vessel, is such that the wall thereof forms an obtuse angle of from about 145° to about 175° with the wall of said draft tube 1. Baffle blades 21 may be employed, if desired, in the lower end of draft tube 1 to increase the shear forces in this region so as to reduce the size of the gas bubbles exiting from said lower end of draft tube 1.

Contrary to conventional AGR systems as illustrated in the patents referred to above, impeller shaft 5 in the FIG. 1 embodiment of the present invention has a hollow portion 14 that extends from the portion of the shaft positioned in the overhead gas space 4 above gas-liquid interface 3 to at least the location of gas ingestion tubes 15 employed for the secondary gas ingestion purposes of the invention in order to increase the range of liquid levels over which the AGR system can be efficiently operated. As shown in said FIG. 1, gas ingestion tubes 15 can be positioned both above inlet guide baffles 12 and at or below the top of helical impeller 8 within draft tube 1, said tubes both being positioned in the body of liquid 2 below gas liquid interface 3 over the course of the desired gas-liquid mixing operation. The lower illustrated gas ingestion tube 15 will typically be immersed in liquid at all times during the gas liquid mixing operation. Upper illustrated tube 15 may, in some embodiments, be positioned above the liquid level and then become immersed in the liquid over the course of the gas liquid mixing operation.

Gas ingestion tubes 15 will be understood to comprise open ended tubes preferably extending, as shown in the drawing, essentially radially outward from impeller shaft 5 into the surrounding liquid. Said tubes 15 are affixed to impeller shaft and will be understood to extend therein so as to establish fluid communication with hollow portion 14 of impeller shaft 5. As shown in FIG. 1 of the drawing, said hollow portion 14 of impeller shaft 5 has at least one gas inlet opening 16 at the upper end thereof, in overhead gas space 4, to similarly establish fluid communication between said hollow portion 14 of impeller shaft 5 and the gas in overhead gas space 4 above gas liquid interface 3.

Those skilled in the art will appreciate that, as gas ingestion tubes 15 are moved through the surrounding liquid essentially perpendicular to the long axis of draft tube 1, the pressure in the bulk liquid immediately adjacent to the outer end of the tubes will be reduced. As a consequence, liquid present in gas ingestion tubes 15 before rotation of impeller shaft 5 will tend to flow out of the tubes upon rotation thereof upon rotation of impeller shaft 5. If the magnitude of the pressure reduction at the outer end of gas ingestion tubes 15 exceeds the hydrostatic head of liquid in said gas ingestion tubes 15, all of the liquid will be drawn out of the tubes and of hollow portion 14 of impeller shaft 5 down to the location of said gas ingestion tubes 15 on impeller shaft 5. At this point, gas will be drawn out as well, a suction thereby being created so that gas from overhead gas space 4 is drawn through gas inlet 16 as shown by arrow 17 into hollow portion 14 of impeller shaft 5 for passage downward therein, as shown by arrows 18, for discharge through the outer end of gas ingestion tubes 15, as shown by arrows 19, in the form of gas bubbles 20 into the surrounding liquid. Since the hydrostatic head existing in gas ingestion tubes 15 must be overcome before gas will start to flow therethrough from overhead gas space 4 into the surrounding liquid, it is generally preferred that said gas ingestion tubes 15 be positioned, as shown in the drawing, at only a moderate distance below the maximum liquid level in the vessel.

It should be noted that the rotational motion of gas ingestion tubes 15 tends to impart a rotational motion to the liquid through which said tubes are passed. Such rotational motion of the liquid may tend to reduce the relative motion of the leading edge of impeller 8 relative to the liquid in draft tube 1 immediately above said impeller 8. As a consequence of such reduction in relative motion, the pumping action of impeller 8 may be reduced. The use of baffle 12, as shown in the drawing, at the upper inlet end of draft tube 1 will offset this effect in the preferred embodiments of the invention in which such baffle means are employed.

The magnitude of the negative pressure, i.e., the reduction in pressure, at the outer end of gas ingestion tubes 15 is dependent upon the velocity at which the outer end of said tubes is moving through the liquid. The larger the radius of the tube extremity for a given rotational speed, the higher will be the peripheral speed and the greater will be the suction, and the related gas aspiration from the overhead gas space, that will be developed. It will be appreciated, therefore, that gas ingestion tubes 15 tend to be made as long as is practical, while enabling gas bubbles 20 to be drawn with liquid down draft tube 1 under the down pumping action of impeller 8. Moderately short tubes can also be employed, but generally at a lesser efficiency. Typically, the radius of the tip of said auxiliary gas ingestion tubes 15 may be from as little as 10% greater than that of of impeller shaft 5 up to as much as about 98% of the inside diameter of draft tube 1. Gas ingestion tube 15 lengths outside this range may also be applicable depending upon the overall conditions pertaining to a given AGR application Preferably, the tip radius will generally be from about 75% to about 95% of the interior diameter of said draft tube 1.

In operation of the AGR system of the invention, a vortex is formed downward of gas-liquid interface 3 in the vicinity of baffles 12 and conical inlet section 13 of draft tube 1, such that gas is drawn from overhead gas space 4 into and down draft tube 1. The amount of gas ingested into the liquid is a function of the depth of liquid above draft tube 1, including conical section 13, if employed, and the pitch of impeller 8 and its rotational speed. For a two foot diameter impeller 8, the rotational speed is conveniently in the range of from about 50 revolutions per minute (rpm) to about 1,000 rpm, preferably from about 200 to 400 rpm. For such a two foot impeller, the desired liquid level is in the range of from about 1 inch to about 15 inches above the uppermost part of draft tube 1, including conical section 13, if employed. It will be appreciated that there will be a different desired liquid level for each AGR application, draft tube diameter, and impeller rotational speed. The optimum desired liquid level is often determined by routine trial and error, with the desired level being one that will permit the vortices to form and be maintained under essentially constant liquid level conditions.

The invention herein described and claimed, as will be evident from the descriptions above, is directed to gas liquid mixing applications in which said optimum liquid level is not obtained or maintained. For purposes of the invention, one or more of said gas ingestion tubes 15 are positioned, as described above, below the maximum desired liquid level, i.e., below gas-liquid interface 3. It is within the scope of the invention, and may even be desirable, to position one or more of such gas ingestion tubes 15 above the optimum desired liquid level of AGR systems operating only with vortex ingestion means. It will be understood that any such additional gas ingestion tubes 15 would be operative to contribute to the gas ingestion process only when the rise in liquid level is such as to submerge said additional tubes below the liquid level in the mixing vessel.

Figure 2:
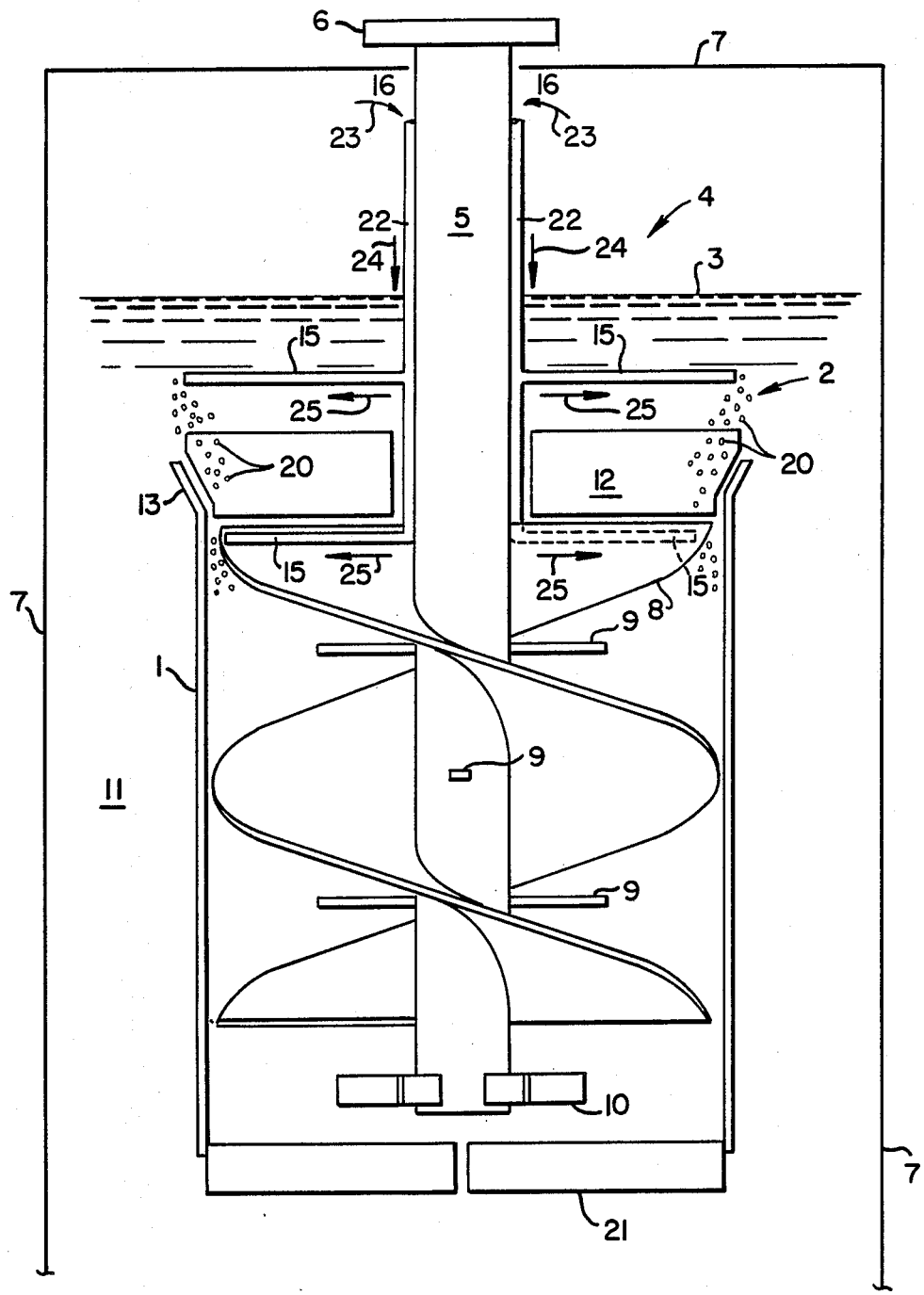
FIG. 2 is a side elevation view of another embodiment in which vertical tubes proximate to the impeller shaft are used to establish fluid communication between the overhead gas space and said tubes radially extending from said shaft.

With reference to FIG. 2 of the drawings, the embodiment of the AGR system illustrated therein is similar to that of the FIG. 1 embodiment except that impeller shaft 5 is shown as a solid shaft not having hollow portion 14 as in the FIG. 1 embodiment. Instead, vertically extending hollow tubes 22 are positioned in close proximity to impeller shaft 5 and extend from the overhead gas space 4 above gas liquid interface 3 to at least the location of gas ingestion tubes 15 employed for the secondary gas ingestion purposes of the invention and positioned as in the FIG. 1 embodiment. Said hollow tubes 22 will be understood to be affixed to or otherwise connected to gas ingestion tubes 15 so as to establish fluid communication therebetween. As shown in the drawing, hollow tubes 22 have open upper ends 16 in overhead gas space 4 to similarly establish fluid communication between said hollow tubes 22 and the gas in overhead gas space 4 above gas liquid interface 3.

In the FIG. 2 embodiment, all of the liquid will be drawn out of gas ingestion tubes 15 and out of hollow tubes 22 when the magnitude of the pressure reduction at the outer end of gas ingestion tubes 15 exceeds the hydrostatic head of liquid in said gas ingestion tubes 15 upon rotation thereof upon rotation of impeller shaft 5. At this point, as in the FIG. 1 embodiment, gas will be drawn out as well, a suction thereby being created so that gas from overhead gas space 4 is drawn through the open upper ends 16 of hollow tubes 22, as shown by arrows 23, for passage downward therein, as shown by arrows 24, for passage into gas ingestion tubes 15 and therethrough, as shown by arrows 25, and discharge, in the form of gas bubbles 20, into the surrounding liquid.

In an example illustrating the benefits of the invention, a 6" diameter AGR impeller with a hollow shaft was modified for the installation of a multiplicity of several ¼" O.D. by about ⅛" I.D. gas ingestion tubes into the impeller shaft to establish fluid communication with the hollow portion thereof. Said impeller shaft also had a gas inlet in the portion of the shaft above the maximum desired liquid level so as to establish fluid communication with the gas in the overhead gas space for purposes of the invention. All of the gas ingestion tubes were positioned so as to be below the gas-liquid interface at said maximum desired liquid level. Three of the tubes were placed about ¾" above the top of the impeller helix at about 120° angles to each other. Two other gas ingestion tubes were placed about 2" below the top of the impeller helix at 90° relative to where the inside diameter of the impeller helix touched the impeller shaft. These latter two tubes were used in place of the turbulence promoters typically located in these positions. The outer end of these gas ingestion tubes extended to within about ⅜" of the inside of the draft tube, while the three higher positioned tubes extended to about the inside diameter of the upper end of the conical section of the draft tube, as illustrated in the drawing. Two ¼ inch diameter holes were drilled into the hollow impeller shaft about 11 inches above the helix to provide a communication means for the gas above the gas liquid interface into the hollow portion of the impeller shaft.

For comparative purposes, this AGR unit was operated with water at various liquid levels in the container vessel above the top of the draft tube and with the ends of the gas ingestion tubes plugged so that they could not contribute to the qas ingestion process of the AGR system. Subsequently, the AGR unit was operated with the ends of said gas ingestion tubes unplugged. The comparative mass transfer rate of oxygen into the water was determined by measuring the rate of increase of dissolved oxygen from the overhead gas space into the water as a function of time after the initial dissolved oxygen had been removed. It was found that the maximum mass transfer rate with the impeller rotating at, for example, 575 rpm, with the gas ingestion tubes blocked, was obtained when the water level was about 2 ½" above the upper end of the draft tube. When the water level was increased to about 3 ⅞" above the draft tube, the mass transfer rate had decreased to about 25% of the maximum rate reached at said lower range. This significant decrease was due to the substantially lower gas ingestion rate of the AGR unit, operated in this conventional manner, resulting from the loss of proper vortex formation as the liquid level rose above the optimum level for the AGR unit. When the same unit was operated with the gas ingestion tubes unblocked, the gas ingestion rate for the combination of vortex and submerged ingestion tubes increased so that the mass transfer rate at said higher water level above the draft tube was actually higher than the maximum mass transfer rate achieved at the lower, optimum water level of the AGR unit with the gas ingestion tubes blocked. By the use of said gas ingestion tubes, therefore, the liquid level operating range of an AGR system can be substantially extended.

Those skilled in the art will appreciate that various changes and modifications can be made in the details of the AGR system and the operation thereof without departing from the scope of the invention as set forth in the appended claims. For example, the AGR system can employ any suitable axial flow down pumping impeller means to create the desired downward flow of liquid in the draft tube and resulting vortex formation. While helical impellers typically with a single or double helix configuration, are generally preferred, marine impellers or other commercially available axial flow impellers can also be employed. In addition, the AGR system of the invention can include baffles at the lower outlet end of the draft tube, similar to inlet baffles 12 at the upper inlet end of said draft tube. Such outlet baffles can be employed to facilitate the circulation of liquid upward in the annular space between the draft tube and the walls of the mixing vessel, and to reduce the size of the gas bubbles exiting from the lower end of the draft tube. It will also be appreciated that the components of the AGR system can be made of any convenient, conventional materials compatible with the contemplated gas-liquid mixing operation to be carried out therein. Thus, various metal alloys, plastics and glass materials may be employed in particular applications. Representative examples of suitable materials include stainless steel, rubber coated steel and titanium.

The invention can be employed with respect to any gas-liquid mixing operation in which it is desired to enhance gas ingestion from an overhead gas space by vortex development and the liquid level in the mixing vessel is above the optimum for the particular AGR system. While the gas ingestion tubes of the invention were disclosed and illustrated, in accordance with preferred embodiments in which said tubes extend radially outward from the impeller shaft, those skilled in the art will appreciate that said tubes may otherwise extend outward so long as the tubes are positioned so that the magnitude of the pressure reduction adjacent the outer end thereof exceeds the hydrostatic head of liquid over the tubes.

The invention will be seen to enable the benefits of the AGR process and system to be extended to applications in which non optimum liquid levels in the gas liquid mixing vessel inhibit proper vortex development and ingestion thereby of gas from the overhead gas space into the gas liquid mixture in the vessel. By thus extending the range of applications in which the enhanced gas-liquid mixing of the AGR technology is applicable, the invention provides a commercially important and highly beneficial advance in the art of effectively and efficiently mixing hydrogen, oxygen or other industrial gases with liquid for desired mixing purposes.

We claim:

1. A process for mixing a gas and a liquid subject to change in liquid levels during the mixing operation in a mixing vessel having a hollow draft tube with an axial flow, down-pumping impeller means positioned thereon for vortex development and the ingestion of gas from an overhead gas space within the mixing vessel into the body of liquid therein, comprising:

(a) rotating said impeller means to create a recirculation flow pattern within the mixing vessel, with liquid passing downward inside the draft tube and upward in the annular space between said draft tube and the walls of the mixing vessel, so as to develop a vortex and to draw gas from the overhead gas space by gas ingestion at an operating liquid level within the mixing vessel;

(b) continuing to rotate said impeller means to create a recirculation flow pattern within the mixing vessel as the liquid level increases during the gas-liquid mixing operation such that vortex formation and gas ingestion become less favorable than occurs at said particular operating liquid level; and (c) establishing fluid communication between said overhead gas space and gas ingestion tube means connected to the shaft of said impeller means that extend upward from said hollow draft tube through said overhead gas space, said gas ingestion tube means extending outward into the surrounding liquid, said gas ingestion tube means including a plurality of tubes positioned below the maximum liquid level and at least some of said tubes being positioned above said draft tube within the mixing vessel and having openings at the ends of said tubes facing outwardly away from said shaft, and being positioned such that the pressure reduction in the body of liquid adjacent the openings at the ends of the gas ingestion tube means upon continued rotation of said impeller means exceeds the hydrostatic head of liquid pertaining in the draft tube upon operation at liquid levels above said operating level for gas ingestion by vortex development, so that liquid present in the gas ingestion tube means and in the means for establishing fluid communication with the overhead gas space at the start of the gas-liquid mixing operation are drawn out through the gas ingestion tube means into the body of liquid, with gas from the overhead gas space likewise being drawn into the body of liquid through said fluid communication means and said gas ingestion tube means as said liquid level increases during continuation of said gas-liquid mixing operation, whereby the gas-liquid mixing operation can be effectively combined over a range of liquid levels within the mixing vessel.

2. The process of claim 1 in which fluid communication is established between the overhead gas space and gas ingestion tubes connected to the impeller shaft by means of a hollow portion of said impeller shaft extending from said overhead gas space to the position of said gas ingestion tubes.

3. The process of claim 2 in which said fluid communication is established at more than one level below the maximum liquid level in the vessel.

4. The process of claim 2 in which fluid communication is established between the overhead gas space and the portion of said body of liquid both in the draft tube and above said draft tube.

5. The process of claim 1 in which fluid communication is established between the overhead gas space and the portion of said body of liquid in the draft tube.

6. The process of claim 1 in which fluid communication is established between the overhead gas space and gas ingestion tubes connected to the impeller shaft by means of one or more vertical tubes positioned proximate to the impeller shaft and extending from said gas ingestion tubes up into said overhead gas space.

7. The process of claim 6 in which said fluid communication is established at more than one level below the maximum liquid level in the vessel.

8. The process of claim 7 in which said fluid communication is established by more than one said vertical tubes.

9. An apparatus for mixing a gas and a liquid subject to change in liquid levels during the mixing operation comprising:

(a) a mixing vessel having a hollow draft tube with an axial flow, down-pumping impeller means positioned thereon and capable of creating a recirculation flow pattern within the mixing vessel, with liquid being passed downward inside the draft tube and upward in the annular space between the draft tube and the walls of the mixing vessel, thereby developing a vortex and drawing gas from the overhead gas space within the mixing vessel at an operating liquid level within said mixing vessel;

(b) gas ingestion tube means connected to the shaft of said impeller means, said impeller shaft extending upward from said hollow draft tube through said overhead gas space in the mixing vessel, said gas ingestion tube means extending outward into the surrounding liquid in the mixing vessel below the maximum liquid level to be employed in the mixing vessel, and said gas injection tube means including a plurality of tubes positioned below the maximum liquid level and at least some of said tubes being positioned above said draft tube within the mixing vessel and having openings at the ends of said tubes facing outwardly away from said shaft providing for fluid communication with the liquid in said mixing vessel when the liquid level is above the positioning of said gas ingestion tube means, said gas ingestion tube means being positioned such that pressure reduction in the body of liquid adjacent the openings at the ends of the gas ingestion tubes means upon rotation of said impeller means exceeds the hydrostatic head of liquid upon operation at liquid levels above said operating level for gas ingestion by vortex development; and (c) fluid communication means between said overhead gas space and said gas ingestion tube means, said gas ingestion tube means thereby providing fluid communication between the overhead gas space and the body of liquid at the openings at the ends of said gas ingestion tube means, so that liquid present in the gas ingestion tube means and in the means for establishing fluid communication with the overhead gas space are drawn out through the gas ingestion tube means into the body of liquid, with gas from the overhead space likewise being drawn into the body of liquid through said fluid communication means and said gas ingestion tube means as said liquid level increases during continuation of the gas-liquid mixing operation, whereby the gas-liquid mixing operation can be effectively continued over a range of liquid levels within the mixing vessel.

10. The apparatus of claim 9 in which said gas ingestion tube means comprises gas ingestion tubes connected to the impeller shaft.

11. The apparatus of claim 10 in which said gas ingestion tubes are positioned at more than one level below the maximum liquid level in the vessel.

12. The apparatus of claim 10 in which at least one gas ingestion tube is positioned in the draft tube.

13. The apparatus of claim 10 in which said gas ingestion tubes are positioned in the draft tube and above said draft tube.

14. The apparatus of claim 9 in which said fluid communication means comprises a hollow portion of said impeller shaft, said hollow portion extending from said overhead gas space to the position of said gas ingestion tube means, said impeller shaft having gas inlet means to establish fluid communication between said overhead gas space and the hollow portion of the impeller shaft.

15. The apparatus of claim 14 in which said gas ingestion tube means comprises gas ingestion tubes positioned at more than one level below the maximum liquid level in the mixing vessel.

16. The apparatus of claim 15 in which at least one gas ingestion tube is positioned in the draft tube.

17. The apparatus of claim 15 in which said gas ingestion tubes are positioned in said draft tube and above said draft tube.

18. The apparatus of claim 9 in which said fluid communication means comprises one or more vertical tubes positioned proximate to the impeller shaft and extending from said gas ingestion tubes up into the overhead gas space.

19. The apparatus of claim 18 in which said gas ingestion tube means comprises gas ingestion tubes positioned at more than one level below the maximum level in the mixing vessel.

20. The apparatus of claim 18 in which said fluid communication means comprises more than one said vertical tubes.

* * * * *